United States Patent [19]

Trias

[11] Patent Number: 4,992,880
[45] Date of Patent: Feb. 12, 1991

[54] HIGH DEFINITION VIDEO-RATE LASER-ADDRESSED LIQUID-CRYSTAL LIGHT-VALVE PROJECTION DISPLAY

[75] Inventor: John A. Trias, La Mesa, Calif.

[73] Assignee: The United States of America as represented by the Secretary of the Navy, Washington, D.C.

[21] Appl. No.: 359,786

[22] Filed: May 24, 1989

[51] Int. Cl.⁵ ............................................. H04N 5/74
[52] U.S. Cl. .................................... 358/236; 358/235
[58] Field of Search ................ 358/231, 232, 233, 235, 358/236

[56] References Cited

U.S. PATENT DOCUMENTS

| | | | |
|---|---|---|---|
| 4,533,215 | 8/1985 | Trias et al. | 350/347 E |
| 4,611,245 | 9/1986 | Trias | 358/235 |
| 4,623,219 | 11/1986 | Trias | 350/351 |
| 4,851,918 | 7/1989 | Crowley | 358/235 X |

OTHER PUBLICATIONS

Grinberg et al "Photoactivated Birefringent Liquid-Crystal Light Valve for Color Symbology Display", published in IEEE Transactions on Electron Devices, Sep. 1975, pp. 775-783.
Bademian "Acousto-Optic Modulation and Deflection", published in the Optical Industry and Systems Purchasing Directory, 1980, pp. B-823-B-826.
Johnson et al. "Optical Beam Deflection Using Acoustic-Traveling-Wave Technology", published in SPIE vol. 90, Acousto-Optics (1976) pp. 40-48.
Merry et al. "Acousto-Optic Laser Scanning", published in SPIR vol. 169 Printing (1979) pp. 56-59.
Bademian "Acousto-Optic Laser Recording", published in Optical Engineering Jan./Feb. 1981, vol. 20, No. 1, pp. 143-149.

Primary Examiner—James J. Groody
Assistant Examiner—Mark R. Powell
Attorney, Agent, or Firm—Harvey Fendelman; Thomas Glenn Keough

[57] ABSTRACT

A high definition, video-rate laser-addressed liquid-crystal light-valve projection display provides for real-time applications to large-area projection displays. A laser raster scanner uses acousto-optic components to modulate and deflect the laser beam. An acoustic optical, acoustic traveling wave lens is included to increase the optical resolution of the scanner system. A liquid-crystal light-valve spatially is modulated by a high resolution coherent beam to responsibly modulate a high intensity light coming from an arc lamp source. The modulated high intensity light is reflected from the liquid-crystal light-valve and is projected onto a large screen. The use of acousto-optic Bragg cells to modulate, horizontally track, horizontally chirp and vertically impart a beam of coherent light allows a projection of a 1075-line RS-343A high definition or resolution TV standard image on the screen.

3 Claims, 1 Drawing Sheet

HIGH DEFINITION VIDEO-RATE LASER-ADDRESSED LIQUID-CRYSTAL LIGHT-VALVE PROJECTION DISPLAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Light-valve projection technology has been proven to offer potential solution to high brightness and high resolution large screen display requirements. The liquid-crystal light-valves which are at the heart of these projection schemes inherently are used in the real time projection imaging at current 525 line vide rates. A capability of the liquid-crystal light-valves which is not appreciated generally is that they have the potential of achieving resolution of greater than 2,000 TV lines and have a photosensitivity of less than 50 $\mu W/cm^2$. The current use of these light valves has not taken advantage of their full utilization potential as an high definition or ultra-high resolution device because in some applications they are limited by the resolution or the cathode ray tube used to photoactivate the liquid-crystal light valve.

In an effort to exploit the high resolution and relatively high speed display capability of the photoactivated LCLV and to develop a more compact and rugged raster scanner, 525-line video-rate laser-addressed LCLVs were developed by John A. Trias in his U.S. Pat. Nos. 4,533,215, 4,611,245, and 4,623,219. The first of these patents uses a partially mechanically displaced scanning beam. The later two patents rely on a compact, all solid state laser raster scanner using acousto-optic components to modulate and deflect the laser beam and the high speed acousto-optic horizontal laser beam deflector employed in the laser raster scanner design operated in a conventional way. These designs conformed to an EIA RS-170 TV standard. The laser raster scanner of these designs, while highly suitable for the 525-line video-rate, could not achieve the resolution needed for greater than 1000 TV lines using the disclosed acousto-optic devices.

Thus, a continuing need exists in the state of the art for a high definition laser-addressed liquid-crystal light-valve projection display having the capability to achieve an acceptable resolution higher than 1,000 TV-lines.

SUMMARY OF THE INVENTION

The present invention is directed to providing a high definition video-rate laser-addressed liquid-crystal light-valve projection display on a distant screen with an acceptable resolution higher than 1,000 TV-lines. A laser beam is deflected by a laser raster scanner having an acousto-optical modulator Bragg cell, a low resolution acousto-optical beam deflector to track the laser beam, an acousto-optical horizontal traveling lens deflector driven by a chirp and a high resolution, low speed acousto-optical deflector for the vertical scan that scans a high-resolution beam on a liquid-crystal light-valve that spatially modulates the high-intensity light from an arc lamp source for projection onto a large screen.

An object is to provide an improvement for a large screen display having an improved resolution.

Another object is to provide a high-speed laser beam scanning display with a resolution greater than 1,000 TV-lines at video rates.

Another object is to provide a high-resolution high-speed visual display relying on solid state technology to avoid the problems normally associated with mechanical scanning and display systems.

Yet another object is to provide a high-speed high-resolution laser-addressed photoactivated liquid-crystal light-valve for projecting real time video on a large screen display.

An object of the invention is to develop a high resolution laser-addressed liquid-crystal light-valve imaging system operating at video rates for real time application to large area projection displays at a greater than 1000 TV line resolution.

These and other objects of the invention will become more readily apparent from the ensuing specification and drawings when taken in conjunction with the appended claims.

DESCRIPTION OF THE PREFERRED EMBODIMENT

The inventive concept to be herein disclosed was constrained to operate within the United States high-resolution TV standard RS-343-A as established by the Electronic Industries Association. This standard, among other things, defines the total horizontal line time T to be 31 microseconds of which 7 microseconds are allotted to blanking during horizontal flyback. This gives an active time of 24 microseconds during a 1075-line raster format at a frame rate of 30 Hz (interlaced 2:1).

Figure 2:
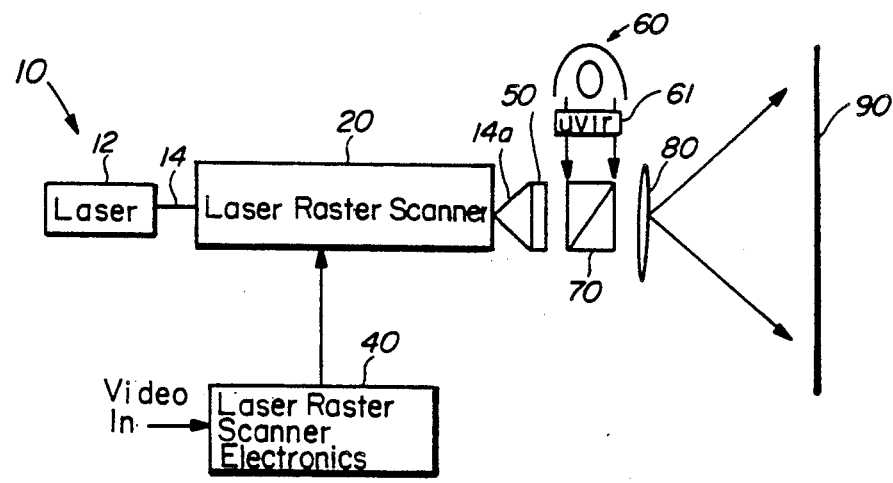
FIG. 2 depicts a schematic diagram of a laser/light-valve display.
Figure 3:
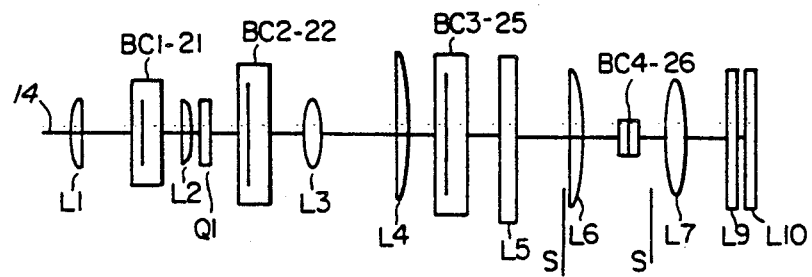
FIG. 3 depicts in schematic form the laser raster scanner for assuring high-resolution light screen display.

Looking to FIG. 2 the projection display at first appearance appears to be quite like the systems described in the three above identified patents of John A. Trias in that the high definition projection display 10 has a laser 12 directing a beam 14 into a laser raster scanner LRS 20. The LRS 20, to be elaborated on below, is appropriately driven by typical laser raster scanner electronics 40 so that an appropriately scanned coherent light beam 14a is written on a liquid-crystal light-valve 50. This causes an appropriate modulation of a high intensity polarized light beam from a xenon-arc lamp 60 that radiates high intensity projection light via a polarizing prism 70 onto the liquid-crystal light-valve. As a consequence, a high definition image is projected through the prism 70 and a projection lens system 80 onto a large screen display 90. Other than laser raster scanner 20 of this inventive concept the other components are well established in the art as fully disclosed in the referenced Trias patents.

The capabilities of the aforeidentified structures, however, are greatly enhanced by the functionally interrelated laser raster scanner to provide for the improved high definition projection display. If a standard acousto-optic beam deflection device such as that used in U.S. Pat. Nos. 4,611,245 and 4,623,219 were used to produce the horizontal scan, the number of resolvable spots N for such a device were shown to be approximated by J. Bradford Merry et al in their article entitled "Acousto-Optic Laser Scanning" *SBIE Laser Printing* Vol. 169, (1979). The number of scan spots can be approximated to satisfy the relationship $N = \tau \Delta f(T - \tau)/T$ where $\tau$ is the time for the acoustic wave to transit the optical beam, $\Delta f$ is the bandwidth of the frequency sweep, and T is the time during which the frequency sweep occurs.

The number of resolvable spots using the standard acousto-optic beam deflector device was satisfactory for the 525-line video-rate of the cited patents. However, under the RS-343-A input signal format, only 7 $\mu$sec are available to fully develop the diffracted beam ($\tau = 7$ microseconds). Similarly the frequency sweep can occur only over the total line time giving $T = 31$ microseconds. The requirement for $N = 1280$ resolvable spots per line, therefore, indicates the need for a frequency bandwith, $f = 236$ MHz. Combining this with the necessity of preventing overlap between the first and second diffraction orders results in the need to operate in a frequency range of 236–472 MHz. Design of a TeO$_2$ scanner capable of maintaining uniform Bragg diffraction efficiently across this frequency range is difficult, to say the least.

Figure 1:
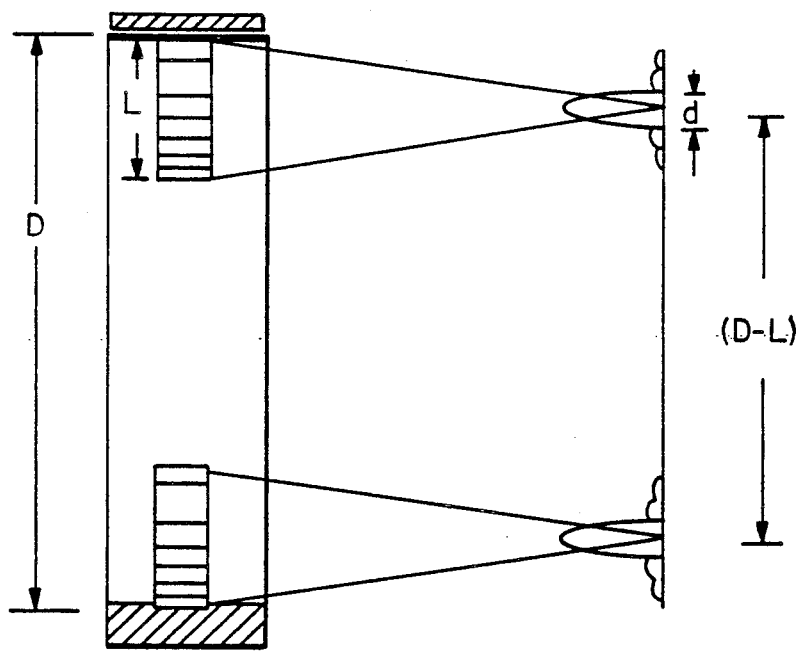
FIG. 1 is a schematic representation of an acoustic traveling wave lens.

To avoid this performance limiting difficulty, laser raster scanner 20, in addition to other constituents, employed a traveling-lens-type acousto-optic scanner BC3-25, a Bragg cell. An acoustic chirp (frequency sweep) causes light to converge or diverge like a cylindrical lens. If a short-duration chirp is produced and allowed to propagate across an illuminated aperture, the effect is to scan a focused spot along a line. This focused spot has a high resolution, note FIG. 1.

The diffraction-limited spot width d for a lens with a uniformly illuminated square aperture of length L is given by the relationship $d = 2\lambda f_x/L$, where $f_x$ is the lens focal length and $\lambda$ is the vacuum wavelength of the light. The distance d is measured between the first zeros on either side of the central maximum in the diffraction pattern, note the right side of FIG. 1 in which the spot width d is shown to conform to this definition.

A chirp lens of duration $t_c$ traveling in a medium with an acoustic velocity v will have a length L expressed by the relationship, $L = vt_c$.

The focal length of such a chirp lens having a duration of $t_c$ was shown by Merry et al. in the above-referred to article as being approximated by the relationship, $f_x = v^2/(\Delta f/\Delta t) \Delta f/\Delta t$, is the frequency chirp rate. Combining the expressed relationship noted above and further noting that the chirp rate is $\Delta f$ over $t_c$, the diffraction limited spot width d can be expressed as $$d = \frac{2\lambda \times v^2}{vt_c\,(\lambda\Delta f/t_c)} = 2v/\Delta f$$

Typically, Rayleigh's criterion is invoked to determine when adjacent spots are "just resolvable". In the above-referred to relationships, the peak of one spot is aligned with the first zero of the adjacent spots, that is, their separation is d/2. If this criterion is accepted, the total number of spots is found by dividing the length of the active line, D·L which is equal to v times t (the active line time) by one-half the spot width giving N equal to $\Delta f$ times t (the active line time).

Using these relationships and method with the RS-343-A active line time and $N = 1280$, delta f is found to be equal to 53.3 MHz. Thus, using the traveling chirp lens approach achieves the desire resolution using acoustic frequencies in the 50–100 MHz. This in turn allows the use of a TeO$_2$ crystal having a flat response over this range of interest to function as an acoustic traveling wave lens BC3-25 in laser raster scanner 20 to achieve the high resolution writing on the liquid crystal light valve.

Acousto-optic laser scanning with resolutions greater than 1,000 spots per line have been shown by R. H. Johnson et al in their article entitled "Optical Beam Deflection Using AcoustoOptic Wave Technology" *SPIE 90 Acousto-Optics* (1975), presented a the SPIE Symposium (August 1976), J. B. Merry et al in their article "Acousto-Optic Laser Scanning" *SPIE Laser Printing* Vol. 169, (1979) and L. Bademian in the article entitled "Acousto-optic Laser Recording" *Optical Engineering* Vol. 20, No. 1 (Jan/Feb 1981). However, these scanning systems operated at less than vide frame rates and did not have to perform to the specifications of the RS-343-A input signal format.

Therefore, the further inclusion of the acoustic traveling wave lens along with components of the three cited Trias patents above, have provided a heretofore unobtainable high definition display capability. Laser 12 was selected to be a 20 mW air-cooled argon-ion CW laser at 514.5 nm. This was found to be sufficient to get the required writing beam 14 of 100 $\mu$W/cm$^2$ at the plane surface of the photoconductor of liquid-crystal lightvalve 50. A frequency-doubled diode-pumped Nd:YAG laser, with 20-mW output at 532 nm and other designs could be selected as well provided that certain capabilities identified herein are met.

Liquid-crystal light-valve 50 spatially modulates a highintensity light projected onto it from xenon-arc lamp 60 via polarizing prism 50. The liquid-crystal light-valve is a reflective mode device which has a cadmium sulfide photosensor on one side to read the laser write beam coming from laser 14a and a liquid-crystal layer on the other side to modulate the high intensity xenon readout beam. The modulated high intensity xenon readout beam is projected onto large screen 90 via prism 70 and lens arrangement 80.

In operation the photosensor layer of liquid-crystal light-valve 50 is illuminated by the write beam 14a which has been appropriately deflected by laser raster scanner 20. An excitation voltage of about 10 V rms at 10 kHz is applied across the liquid-crystal light-valve. In the absence of write-beam illumination, most of the applied voltage appears across the photosensor. With illumination, the resistance of the photosensor drops and the voltage is gated to the liquid-crystal layer, thus spatially modulating the polarization of the xenon-arc beam. The literature is replete with the operation of such a technique so that further details in this regard are unwarranted.

Laser raster scanner 20 is fabricated to assure that the high-resolution scan is in fact performed in real time. An acousto-optic modulator BC1-21 is a Bragg cell with an MTF of 0.5 at 50 MHz and is a CTI 3200 by Crystal Technology Inc. of Palo Alto, Calif. Laser beam 14 coming from laser 12 thereby is modulated in intensity to convey information that will be seen on screen 90. The modulated beam passes through lenses L1, L2 and a quarter wave plate Q1 before reaching a low resolution acousto-optic beam deflector BC2-22 that allows the laser beam to track the chirp provided by an acoustic traveling wave lens BC3-25. BC3-25 is a Bragg cell that is a high-resolution acousto-optical horizontal traveling lens deflector and is driven by the chirp signal coming from laser raster scanner electronics 40. The Bragg cells of BC2-22 and BC3-25 are CTI 4705-S and CTI 4075-IC marketed by Crystal Technology Inc. The chirp technique is well known for related optical beam deflection and is fully developed in the cited articles by R. H. Johnson, J. B. Merry, and L. Bademian cited above.

The horizontally deflected beam passes through a low-speed acousto-optic deflector BC4-26, a CTI 4075-IC. BC4-26 is a high-resolution but low-speed acousto-optic deflector for the vertical scan. A pair of optical stops S and lenses L1–L10 are included to shape and guide the beam in accordance with well accepted techniques. Such lens systems and stops are conventionally used in designs of this type and as such the selective inclusion of one design over another is a matter of choice routinely made by one skilled in the art to which this invention pertains.

Laser raster scanner 20 fabricated to include the specific acoustic traveling wave lens BC3-25 assures that the RS-343-A input signal format can be accommodated to provide the high definition real-time video-rate laser-addressed liquid-crystal light-valve projection display. Arc lamp 60, ultraviolet and infrared filters 61, polarizing prism 70 and telecentric projection lens 80 project the high definition images. Light from the projection lamp is collimated, filtered, polarized and directed by prism 70 to the read-side of liquid-crystal light-valve cell 50. The projection light beam then passes through the liquid-crystal layer of the liquid-crystal light-valve and is reflected by the dielectric mirror back through polarizing prism 70 which serves as both a polarizer and an analyzer in the transmission of optical information from the liquid-crystal light-valve through the telecentric lens for projection onto screen 90.

The high definition projection display is capable of receiving input signals from a TV receiver, TV camera, computer data terminal, TV signal test generator, or whatever other source that conforms to a modified 1075-line RS-343 A high-resolution TV standard. While this standard has been referred to, other rates can be accommodated to provide a high definition display. Resolution of more than 1300 TV lines has been measured using a TV test-generator input signal. Overall optical throughput efficiency of the laser raster scanner system is 2%.

The potential high-resolution and relatively high-speed display capabilities of a photoactivated liquid-crystal light-valve is successfully exploited by the use of the disclosed arrangement of acousto-optic Bragg cells has been demonstrated. The real-time display of greater than 1300 TV lines at video rate has been demonstrated. The high-resolution TV rates is capable with this system employing the improvement of laser raster scanner 20.

Obviously, many modifications and variations of the present invention are possible in the light of the above teachings. It is therefore to be understood that within the scope of the appended claims the invention may be practiced otherwise than as specifically described.

I claim:

1. An apparatus for displaying high definition projected images on a distant screen in accordance with a greater than 1000 TV-line resolution at video-image signal rates comprising:
    a laser providing a beam of coherent light;
    means disposed to receive the beam of coherent light for modulating it at the video-image signal rates;
    means disposed to receive the modulated beam of coherent light for tracking the modulated beam of coherent light in a horizontal direction;
    an acousto-optic traveling wave lens disposed to receive the modulated and tracked beam of coherent light for chirping the modulated and tracked beam of coherent light to scan a focused spot along a horizontal line to thereby increase the resolution thereof;
    means disposed to receive the modulated, tracked and chirped beam of coherent light for imparting a scan thereof in the vertical direction;
    means connected to the modulating means, the tracking means, the acousto-optic traveling wave lens and the imparting means for providing signals to control the modulation, horizontal tracking, horizontal chirping and vertical imparting of the beam of coherent light;
    means aligned to receive the modulated, horizontally tracked, horizontally chirped and vertically imparted beam of coherent light for selectively changing the polarization orientation of linearly polarized light incident thereon in direct response to the voltage pattern directly produced therein by the modulated, horizontally tracked, horizontally chirped and vertically imparted beam of coherent light;
    means disposed for projecting a high intensity light beam in a light path to the light polarization orientation changing means; and
    a liquid-crystal light valve interposed in said light path between the light polarization orientation changing means and the high intensity light beam projecting means for reflecting linearly polarized high intensity light onto the light polarization orientation changing means and for directing modulated reflected high intensity light modulated in accordance with the modulated, horizontally tracked, horizontally chirped and vertical imparted beam of coherent light onto the distant screen in the form of real-time, high definition images at video-image signal rates at greater than 1000 TV-line resolution.

2. An apparatus according to claim 1 in which the modulating means, the tracking means, the acousto-optic traveling wave lens and the imparting means are Bragg cells optically cooperating to assure the reflection of a high intensity light onto the distant screen in the form of real-time, high definition images at video-image signal rates at greater than 1000 TV-line resolution.

3. An apparatus for modulating and scanning a coherent light beam to be suitable for a greater than 1000 TV-line resolution at video-image signal rates comprising:
    a laser providing a beam of coherent light;
    means disposed to receive the beam of coherent light for modulating it at the video-image signal rates;
    means disposed to receive the modulated beam of coherent light for tracking the modulated beam of coherent light in a horizontal direction;

an acousto-optic traveling wave lens disposed to receive the modulated and tracked beam of coherent light for chirping and modulated and tracked beam of coherent light to scan a focused spot along a horizontal line to thereby increase the resolution thereof;

means disposed to receive the modulated, tracked and chirped beam of coherent light for imparting a scan thereof in the vertical direction; and means connected to the modulating means, the tracking means, the acousto-optic traveling wave lens and the imparting means for providing signals to control the modulation, horizontal tracking, horizontal chirping and vertical imparting of the beam of coherent light.

* * * * *